United States Patent
Artini et al.

(10) Patent No.: US 7,761,193 B2
(45) Date of Patent: Jul. 20, 2010

(54) METHOD AND DEVICE FOR ENSURING THE SAFETY OF A LOW-ALTITUDE FLIGHT OF AN AIRCRAFT

(75) Inventors: Franck Artini, Toulouse (FR);
Jean-Pierre Demortier, Maurens (FR);
Christophe Bouchet, Toulouse (FR);
Jacques Espinasse, Pibrac (FR);
Edward Strongman, Bretx (FR)

(73) Assignee: Airbus France, Toulouse (FR)

( * ) Notice: Subject to any disclaimer, the term of this patent is extended or adjusted under 35 U.S.C. 154(b) by 997 days.

(21) Appl. No.: 11/128,299

(22) Filed: May 13, 2005

(65) Prior Publication Data

US 2005/0261811 A1 Nov. 24, 2005

(30) Foreign Application Priority Data

May 18, 2004 (FR) .................................. 04 05373

(51) Int. Cl.
*G01C 23/00* (2006.01)
*G05D 1/00* (2006.01)
*G05D 3/00* (2006.01)
*G06F 7/00* (2006.01)
*G06F 17/00* (2006.01)
*G05D 1/08* (2006.01)
*G05D 1/06* (2006.01)
*G01C 5/00* (2006.01)
*G01C 21/00* (2006.01)
*G06F 19/00* (2006.01)
*G06G 7/70* (2006.01)
*G08B 21/00* (2006.01)
*G08B 23/00* (2006.01)

(52) U.S. Cl. .......................... 701/3; 340/959; 340/963; 340/971; 340/976; 340/979; 701/4; 701/5; 701/8; 701/9; 701/18

(58) Field of Classification Search .................... None
See application file for complete search history.

(56) References Cited

U.S. PATENT DOCUMENTS 4,467,429 A * 8/1984 Kendig ......................... 701/3

(Continued)

FOREIGN PATENT DOCUMENTS

EP 0565399 10/1993

(Continued)

OTHER PUBLICATIONS

Preliminary Search Report dated Apr. 28, 2005 with English translation.

*Primary Examiner*—Khoi Tran
*Assistant Examiner*—Nicholas Kiswanto
(74) *Attorney, Agent, or Firm*—Dickinson Wright PLLC

(57) ABSTRACT

Method and device for ensuring the safety of a low-altitude flight of an aircraft.

A device (1) for ensuring the safety of a low-altitude flight comprises information sources (5) able to determine current flight conditions, a monitoring unit (6) for realizing, with the aid of said current flight conditions, a function for global and autonomous monitoring of said low-altitude flight of the aircraft, making it possible to preserve the integrity of said aircraft during said flight, and means (13) for presenting the results of the monitoring function realized by said monitoring unit (6) to an operator.

21 Claims, 4 Drawing Sheets

U.S. PATENT DOCUMENTS

| | | | |
|---|---|---|---|
| 4,924,401 A * | 5/1990 | Bice et al. | 701/6 |
| 5,220,322 A * | 6/1993 | Bateman et al. | 340/970 |
| 5,414,631 A * | 5/1995 | Denoize et al. | 701/301 |
| 5,488,563 A | 1/1996 | Chazelle et al. | |
| 5,706,011 A * | 1/1998 | Huss et al. | 342/65 |
| 5,850,617 A * | 12/1998 | Libby | 701/202 |
| 5,864,307 A * | 1/1999 | Henley | 340/964 |
| 5,892,462 A * | 4/1999 | Tran | 340/961 |
| 5,922,031 A * | 7/1999 | Larrieu | 701/3 |
| 6,163,744 A * | 12/2000 | Onken et al. | 701/3 |
| 6,269,301 B1 * | 7/2001 | Deker | 701/206 |
| 6,437,707 B1 * | 8/2002 | Johnson | 340/959 |
| 6,480,120 B1 * | 11/2002 | Meunier | 340/970 |
| 6,710,723 B2 * | 3/2004 | Muller et al. | 340/970 |
| 6,711,479 B1 * | 3/2004 | Staggs | 701/16 |
| 6,720,891 B2 * | 4/2004 | Chen et al. | 340/969 |
| 6,744,382 B1 * | 6/2004 | Lapis et al. | 340/971 |
| 6,748,325 B1 * | 6/2004 | Fujisaki | 701/301 |
| 2002/0143439 A1 * | 10/2002 | Morizet et al. | 701/3 |
| 2003/0107499 A1 | 6/2003 | Lepere et al. | |
| 2004/0181318 A1 * | 9/2004 | Redmond et al. | 701/9 |
| 2007/0198143 A1 * | 8/2007 | Ybarra et al. | 701/9 |

FOREIGN PATENT DOCUMENTS

| | | |
|---|---|---|
| EP | 0775953 | 5/1997 |
| FR | 2813963 | 3/2002 |

* cited by examiner

METHOD AND DEVICE FOR ENSURING THE SAFETY OF A LOW-ALTITUDE FLIGHT OF AN AIRCRAFT

BACKGROUND OF THE INVENTION

The present invention relates to a method and a device for ensuring the safety of a low-altitude flight of an aircraft which is guided along a flight trajectory comprising a lateral trajectory and a vertical trajectory.

The present invention applies more particularly, although not exclusively, to a military transport plane that exhibits a low thrust/weight ratio and a high inertia, and whose times for maneuver are generally relatively slow.

As regards the present invention, low-altitude flight is taken to mean flight along a flight trajectory (at low altitude) that allows an aircraft to follow the terrain being overflown as closely as possible, in particular to avoid being detected. Such a low-altitude flight trajectory is therefore situated at a predetermined height from the terrain, for example 500 feet (around 150 meters).

By reason of this proximity to the ground, it is necessary for the flight trajectory to be compatible with the capabilities of the aircraft, that is to say the latter must be able to follow it. Specifically an excessive deviation with respect to this flight trajectory could have catastrophic consequences, with in particular a significant risk of collision with the terrain overflown or with an edifice or an element situated on said terrain.

SUMMARY OF THE INVENTION

The object of the present invention is to remedy these drawbacks. It relates to a method of ensuring the safety of a low-altitude flight of an aircraft (which is guided along a flight trajectory comprising a lateral trajectory and a vertical trajectory), which makes it possible to eliminate any risk of collision of the aircraft with the terrain overflown.

For this purpose, according to the invention, said method is noteworthy in that, by taking account of current flight conditions, a function for global and autonomous monitoring of said low-altitude flight of the aircraft is realized, making it possible to preserve the integrity of said aircraft during said flight.

Thus, as by virtue of the invention the monitoring function:
  is global, it makes it possible to eliminate the potential risks of collision of the aircraft with the terrain overflown;
  is autonomous, it is very discreet and is therefore not easily detectable.

More precisely, said monitoring function is global in that it makes it possible to detect all abnormal or unscheduled behavior of an active flight function at low altitude, of standard type, which is used to guide the aircraft along the flight trajectory, and autonomous since the means that it implements are totally uncorrelated from this active function. Associated with said active function, the monitoring function in accordance with the invention makes it possible to obtain a low-altitude flight safety level that is greater than that of this active function alone.

According to the invention, said global and autonomous monitoring function comprises a plurality of functions which all participate, at their level, in maintaining the integrity of the aircraft during a low-altitude flight.

Advantageously, said monitoring function comprises a first monitoring for verifying the compatibility of the flight trajectory with the terrain to be overflown, that is to say to verify whether the flight trajectory is secure with respect to said terrain.

Advantageously, said first monitoring consists in verifying that the vertical trajectory of the flight trajectory, translated vertically downward by a predetermined guard height, does not intercept (or does not touch) the terrain.

Preferably, to realize this first monitoring, the following operations are performed for each curvilinear abscissa of the lateral trajectory of the flight trajectory:
  the highest altitude under an uncertainty surface related to said curvilinear abscissa is determined;
  this altitude is increased by said guard height so as to form a safety altitude; and
  a check is carried out to verify that the altitude of said curvilinear abscissa is greater than said safety altitude.

Advantageously, said monitoring function comprises a second monitoring for verifying that said flight trajectory is continuous and maneuverable by the aircraft. This second monitoring makes it possible to prevent for example, if a circular arc transition between two rectilinear segments of the flight trajectory is computed with a radius that is too small with respect to the preset speed (and the maximum allowable load factor), the aircraft from being able to hold this radius and striking the surrounding relief.

Advantageously, to realize said second monitoring, the following operations are performed for each curvilinear abscissa of the lateral trajectory of the flight trajectory:
  the lateral and vertical radii of curvature corresponding respectively to the lateral trajectory and to the vertical trajectory are determined at said curvilinear abscissa;
  on the basis of these lateral and vertical radii of curvature are determined:
    a first load factor corresponding to a static load factor due to a turn at constant slope; and
    a second load factor corresponding to a vertical load factor due to a vertical transition at constant course; and
  a check is carried out to verify that said first and second load factors remain less than predetermined maximum values.

Moreover, advantageously, said monitoring function comprises a third monitoring for verifying that the thrust of the aircraft required to maintain the slope and the preset speed such as they are defined for the flight trajectory remains less than the maximum thrust available in the case of a fault with an engine of the aircraft.

As specified hereinbelow, by virtue of this third monitoring, it is possible to detect upstream an incompatibility of slope (flight preset) with the predicted performance of the aircraft. This third monitoring is therefore an upstream monitoring (that is to say performed ahead of the aircraft) which makes it possible to detect an error (made with regard to the constructed vertical trajectory) emanating either from a model of slopes, or from an optimization algorithm, which are used to construct said vertical trajectory. The slope is therefore dependent on the predicted maximum performance of the aircraft.

Furthermore, advantageously, said monitoring function comprises a fourth monitoring for verifying the compatibility of the vertical trajectory with updated theoretical performance of the aircraft, hence the instantaneous performance of the aircraft in terms of climb at maximum slope.

In a first preferred variant, to realize said fourth monitoring, a protection profile is projected onto the vertical trajectory from the current position of the aircraft, downstream, along said vertical trajectory, and a check is carried out to verify that said protection profile thus projected does not intercept said vertical trajectory.

In a second variant, to realize said fourth monitoring, a protection profile is associated with each peak of the vertical trajectory, and a check is carried out to verify the compatibility of the position of the aircraft with respect to said protection profile.

In both cases, account is taken of the turns ahead of the aircraft.

According to the invention, said protection profile depends on the capacity of the aircraft to perform a resource at constant speed and constant load factor and a climb at constant speed and at maximum slope. Preferably, said protection profile comprises a circular arc of constant radius and a rectilinear segment of maximum slope.

Furthermore, advantageously, when said fourth monitoring detects an incompatibility, the vertical trajectory is automatically corrected ahead of the aircraft in such a way as to eliminate this incompatibility, thereby making it possible to avoid any risk of collision of the aircraft with the terrain or to abandon the mission on account of this error (better operational availability).

Additionally, advantageously, said monitoring function comprises a fifth monitoring for verifying the compatibility of the vertical trajectory with actual performance of the aircraft.

Advantageously, to realize said fifth monitoring:
a first maximum slope is determined which represents the maximum slope at which the aircraft can fly under the current flight conditions with a faulty engine;
a second maximum slope is determined which represents the maximum slope at which the aircraft can fly under the current flight conditions with all its engines operational;
a preset slope is determined allowing the aircraft to fly along said flight trajectory; and
a check is carried out to verify that said preset slope is compatible with said first and second maximum slopes.

Preferably, said first and second maximum slopes are determined from the current total slope of the aircraft.

Furthermore, advantageously, said monitoring function comprises a sixth monitoring so as to detect any excessive deviation of the position of the aircraft with respect to said flight trajectory.

Additionally, advantageously, said current flight conditions comprise the current meteorological conditions and current characteristics of the aircraft.

Furthermore, advantageously, a function for ensuring the safety of the flight trajectory during its construction is implemented.

According to the invention, to form the vertical trajectory of said flight trajectory:
a safe terrain profile is determined, on the basis of a terrain profile pertaining to a terrain to be overflown by the aircraft, and which is such that, along the lateral trajectory of the flight trajectory, account is taken as elevation of the terrain, of the elevation which is the highest under an uncertainty surface, to which is added a predetermined guard height; and
said vertical trajectory is formed on the basis of said safe terrain profile.

Thus, by virtue of the invention, the vertical trajectory (or flight profile) of the flight trajectory is determined not directly from the terrain profile which preferably emanates from a digital database and which exhibits a certain margin of error, but from a safe terrain profile which takes account, as specified hereinbelow, of a plurality of margins of error or uncertainties which exist, including that pertaining to the database. This makes it possible to obtain a vertical trajectory limiting the risk of collision of the aircraft with the ground, while permitting low-altitude terrain following. Advantageously, said uncertainty surface depends on an error margin relating to the position of the aircraft, an error margin relating to said terrain profile, and an error margin relating to the guidance of the aircraft along a trajectory. Moreover, advantageously, said uncertainty surface is centered with respect to the lateral trajectory of the flight trajectory.

The present invention also relates to a device for ensuring the safety of a low-altitude flight of an aircraft which is guided along a flight trajectory.

According to the invention, said device is noteworthy in that it comprises:
information sources able to determine current flight conditions;
a monitoring unit for realizing, with the aid of said current flight conditions, a function for global and autonomous monitoring of said low-altitude flight of the aircraft, making it possible to preserve the integrity of said aircraft during said flight; and
means for presenting the results of the monitoring function realized by said monitoring unit to an operator; and, preferably
means for automatically updating said flight trajectory.

In a preferred embodiment, said monitoring unit comprises:
a first monitoring means for verifying the compatibility of the flight trajectory with the terrain to be overflown;
a second monitoring means for verifying that said flight trajectory is continuous and maneuverable by the aircraft;
a third monitoring means for verifying that the thrust of the aircraft required to maintain the slope and the preset speed such as they are defined for the flight trajectory remains less than the maximum thrust available in the case of a fault with an engine of the aircraft;
a fourth monitoring means for verifying the compatibility of the vertical trajectory with updated theoretical performance of the aircraft;
a fifth monitoring means for verifying the compatibility of the vertical trajectory with actual performance of the aircraft; and
a sixth monitoring means for detecting any excessive deviation of the position of the aircraft with respect to said flight trajectory.

Furthermore, advantageously, said device furthermore comprises a means for implementing a function for ensuring the safety of the flight trajectory during its construction.

BRIEF DESCRIPTION OF THE DRAWINGS

The figures of the appended drawing will elucidate the manner in which the invention may be embodied. In these figures, identical references designate similar elements.

DESCRIPTION OF THE PREFERRED EMBODIMENTS

Figure 1:
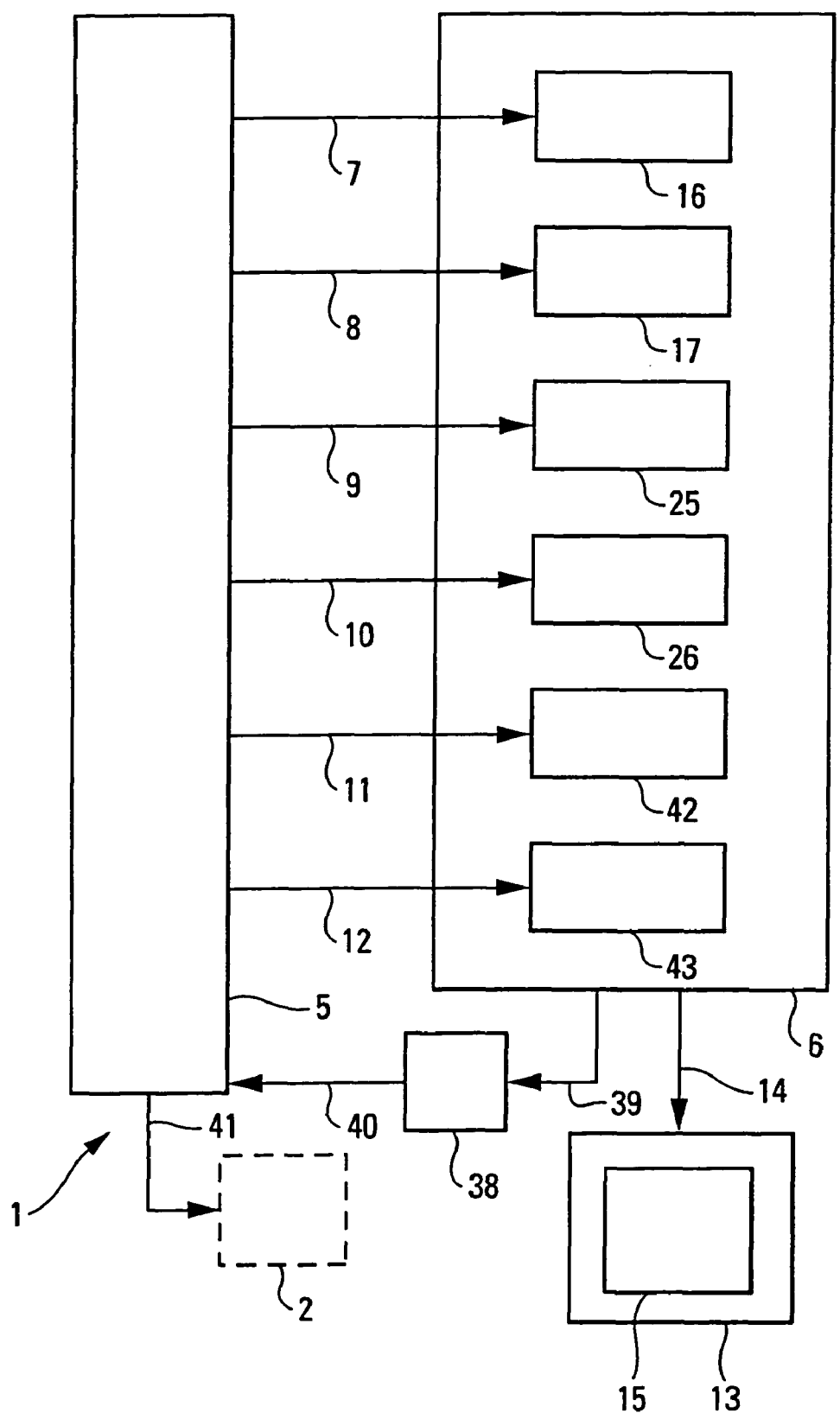
FIG. 1 is the schematic diagram of a device in accordance with the invention.

The device 1 in accordance with the invention and represented diagrammatically in FIG. 1 is intended for ensuring the safety of a low-altitude flight of an aircraft A, in particular a military transport plane. For this purpose, said aircraft A is guided, with the aid of a standard guidance system 2 represented by broken lines in FIG. 1 and implementing a standard and active flight function at low altitude. Said guidance system 2 makes it possible to guide the aircraft A along a flight trajectory TO, comprising a lateral trajectory TL and a vertical trajectory TV (or flight profile).

In a preferred embodiment, said flight trajectory TO is a so-called "string-like" trajectory which consists of rectilinear segments, whose lateral and vertical transitions are circular arcs with constant radii which are situated at curvilinear abscissa and which emanate from considerations of preset speed and of maximum allowable load factors. This flight trajectory TO is an anticipated trajectory, determined with the aid of predicted climb and descent performance. Moreover, it is calculated with the aid of a digital database of the terrain, and hugs, as closely and as well as possible, the configuration of the relief 3 of the terrain 4 overflown.

According to the invention, said device 1 comprises:
standard information sources 5, which are able, in particular, to determine current flight conditions, namely in particular the current meteorological conditions (wind, temperature) and current characteristics (speed, mass, etc.) of the aircraft A;
a monitoring unit 6 specified hereinbelow, which is connected by links 7 to 12 (able to be grouped into a single global link) to said information sources 5 and which is intended to realize, with the aid of said current flight conditions in particular, a function for global and autonomous monitoring of said low-altitude flight of the aircraft A, making it possible to preserve the integrity of said aircraft A during said flight; and
standard means 13, which are connected by a link 14 to said monitoring unit 6, for presenting to an operator, while displaying them for example on a viewing screen 15, the results of the monitoring function implemented by said monitoring unit 6.

Said monitoring unit 6 comprises a monitoring means 16 (connected to the link 7) for verifying the compatibility of the flight trajectory TO with the terrain 4 to be overflown.

The monitoring implemented by this monitoring means 16 consists in verifying that the vertical trajectory TV of the flight trajectory TO, translated vertically downward by a predetermined guard height HG, does not intercept (that is to say does not touch) the terrain 4.

To do this, said monitoring means 16 performs for each curvilinear abscissa (which is situated by definition at the level of the transition between two successive rectilinear segments) of the lateral trajectory TL of the flight trajectory TO, the following operations:
it determines the highest altitude under an uncertainty surface related to said curvilinear abscissa;
it increases this altitude by said guard height HG to form a safety altitude; and
it verifies that the altitude of said curvilinear abscissa is greater than said safety altitude.

In a particular embodiment, said uncertainty surface depends:
on an uncertainty relating to the position of the aircraft A;
on an uncertainty relating to a terrain profile used to construct said flight trajectory TO which is constructed, for example, by standard means that are part of said information sources 5;
on an uncertainty relating to the guidance of the aircraft A along a trajectory with the aid of said guidance system 2.

Additionally, said monitoring unit 6 comprises a monitoring means 17 (connected to the link 8) for verifying that said flight trajectory TO is continuous and maneuverable by the aircraft A.

As indicated previously, the flight trajectory TO is a succession in the two planes lateral and vertical of rectilinear segments, whose transitions are curvilinear and computed as a function of a preset speed selected by the pilot and of considerations of maximum load factor (as well as of margins intended among other things to take account of the departures of wind). The monitoring implemented by the monitoring means 17 consists in verifying that this succession of segments is continuously derivable, and that the flight trajectory TO remains maneuverable by the aircraft A, that is to say that the flight trajectory TO computed does not lead to any overshoot of allowable load factors, namely:
of $Nz$ which is a static load factor (due to a turn at constant slope);
of $\Delta Nz$ which is a straight line vertical load factor (due to a vertical transition, at constant course).

This monitoring makes it possible to prevent for example, if a transition is computed with a radius that is too small with respect to the preset speed, the aircraft A from being able to hold this radius and striking the surrounding relief.

Figure 2:
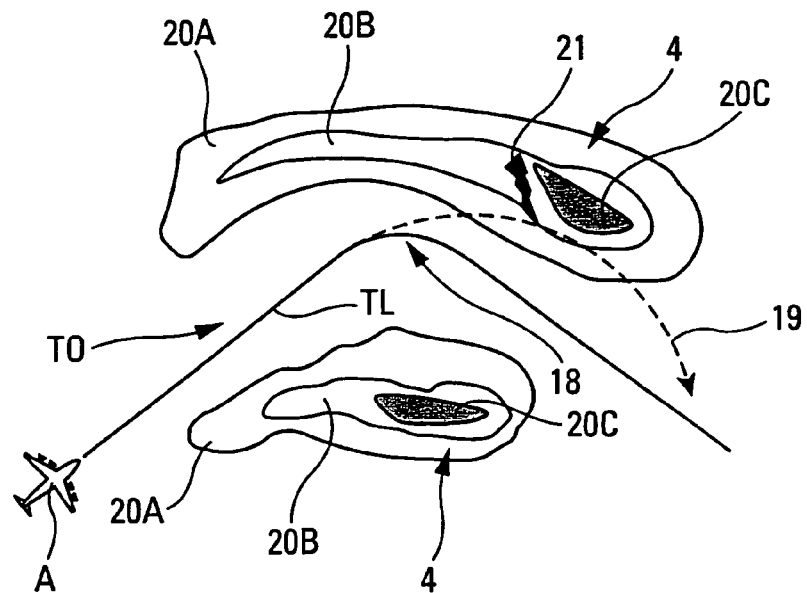
FIGS. 2 and 3 are two graphics making it possible to explain a particular monitoring that is part of the global monitoring function in accordance with the invention.

Represented in FIG. 2 is such a situation in the horizontal plane where the lateral trajectory TL exhibits a circular arc transition 18 with a radius that is too small. This lateral trajectory TL is therefore not maneuverable by the aircraft A. The actually maneuverable trajectory 19 is represented by broken lines and presents a risk of collision with the terrain 4 (presenting zones 20A, 20B, 20C of different altitudes that increase with blackness), signaled by a characteristic sign 21.

Figure 3:
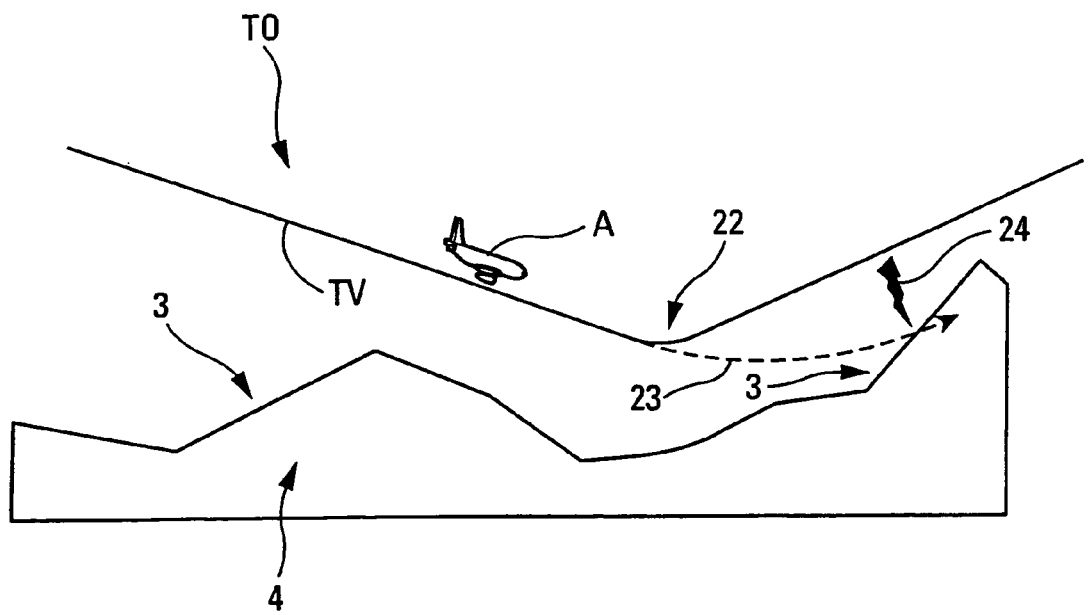

Represented in FIG. 3 is such a situation in the vertical plane where the vertical trajectory TV presents a circular arc transition 22 with a radius that is too small. This vertical trajectory TV is not therefore maneuverable by the aircraft A. The actually maneuverable trajectory 23 is represented by broken lines and presents a risk of collision with the relief 3 of the terrain 4, as recalled by a characteristic sign 24 in this FIG. 3.

To realize the aforesaid monitoring, said monitoring means 17 performs, for each curvilinear abscissa of the lateral trajectory TL of the flight trajectory TO, the following operations:
it determines the lateral and vertical radii of curvature corresponding respectively to the lateral trajectory TL and to the vertical trajectory TV, at said curvilinear abscissa;
it determines on the basis of these lateral and vertical radii of curvature:
a first load factor corresponding to the static load factor $Nz$ due to a turn at constant slope; and
a second load factor corresponding to the vertical load factor $\Delta Nz$ due to a vertical transition at constant course; and
it verifies that said first and second load factors $Nz$ and $\Delta Nz$ remain less than predetermined maximum values, given that there is a mutual dependence between the two planes horizontal and vertical: for example in the case of a turn, the maximum load factor for lateral resource is decreased correspondingly.

Additionally, said monitoring unit 6 comprises a monitoring means 25 (connected to the link 9) for verifying that the thrust of the aircraft A required to hold the slope and the preset speed such as they are defined for the flight trajectory TO remains less than the maximum thrust available in the case of a fault with an engine of the aircraft A.

Such a monitoring makes it possible to detect upstream an incompatibility of slope (flight preset) with the predicted performance of the aircraft A for the same flight assumptions. This monitoring thus makes it possible to detect an error (made with regard to the vertical trajectory constructed) emanating either from a standard model of slopes (model of performance of the aircraft), or from a standard optimization algorithm (algorithm for constructing the trajectory from predicted slopes able to be flown), which are used to construct said vertical trajectory TV.

Additionally, said monitoring unit 6 comprises a monitoring means 26 (connected to the link 10) for verifying the compatibility of the vertical trajectory TV with updated theoretical performance of the aircraft A.

The principle of this monitoring is based on the projection of a protection profile 27 onto the vertical profile (or vertical trajectory TV) of the flight trajectory TO which presents itself ahead of the aircraft A during the flight. Said protection profile 27 shall not interfere with the precomputed vertical profile. Detection of interference will lead to a preventive correction of said vertical trajectory TV. The protection profile 27 therefore presents itself as the ultimate trajectory for passing the peaks of the vertical trajectory TV.

Said protection profile 27 is defined as being the image of the actual capacity of the aircraft A to perform a resource at constant speed and constant load factor, then to perform a climb at constant speed and maximum slope, and to do so for the same theoretical conditions as those which served to precompute the vertical trajectory TV of the flight trajectory TO. The difference lies at the level of computation parameters (mass, etc.) relating to the aircraft A and of exterior parameters (temperature and wind), which are measured and updated continually. Moreover, the precise progress of said parameters may be taken into account to correct, if necessary, the vertical trajectory TV ahead of the aircraft A, as specified hereinbelow.

It will be noted that the monitoring implemented by said monitoring means 26 differs from standard monitorings, in that it is based on the precomputed vertical trajectory TV and not on the relief (detected by a radar or provided by a digital database of the terrain).

Figure 4:
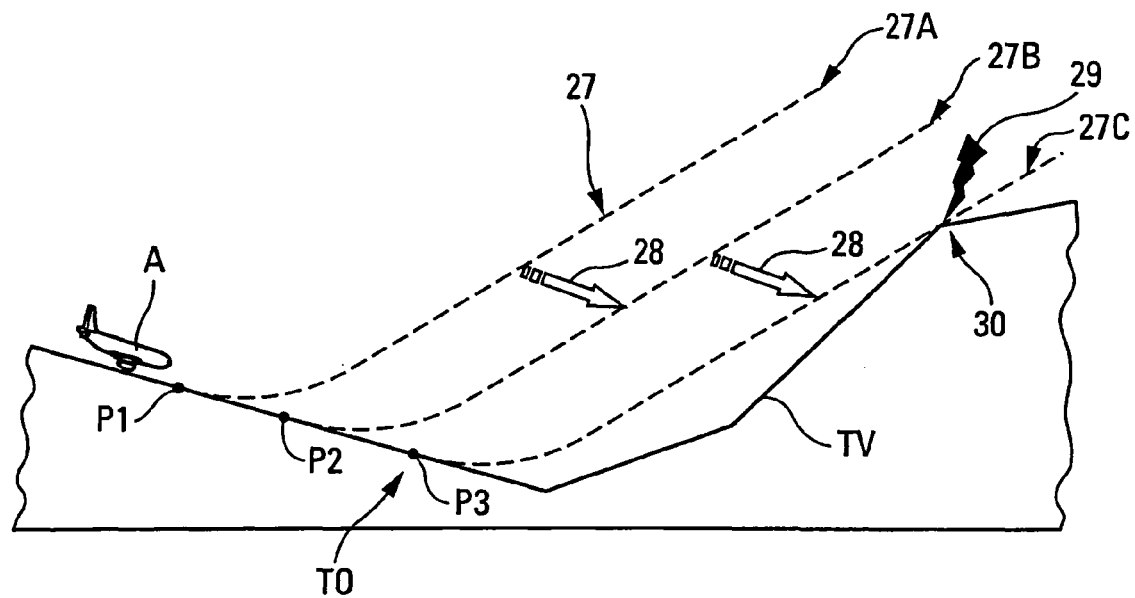
FIGS. 4 to 7 are graphics making it possible to explain another particular monitoring that is part of the global monitoring function in accordance with the invention.

Represented in FIG. 4 are several successive projections 27A, 27B, 27C of the protection profile 27 onto the vertical trajectory TV, for various successive positions P1, P2, P3 of the aircraft A along said vertical trajectory TV. The succession of these projections is indicated by arrows 28.

The projection 27C evidences a problem signaled by a characteristic sign 29 in FIG. 4, since the protection profile 27 intercepts in this position the vertical trajectory TV at a point 30.

In a variant embodiment, the protection profile 27 is related to each peak of the vertical trajectory TV. Thereafter, a backward computation makes it possible to find the point on the vertical trajectory TV to be monitored, onwards of which the aircraft A must climb according to the conditions of computation of said protection profile. In most cases, this point will not be considered, since it will lie beyond the vertical trajectory TV in the direction of flight. The points to be considered are then those which are situated ahead of the slope, since the slope of the protection profile 27 is then less than the computed slope, this possibly being a source of danger. The monitoring implemented by the monitoring means 26 then consists in determining the relative departure of the aircraft A from this point, and to do so for each peak of the vertical trajectory TV.

Figure 5:
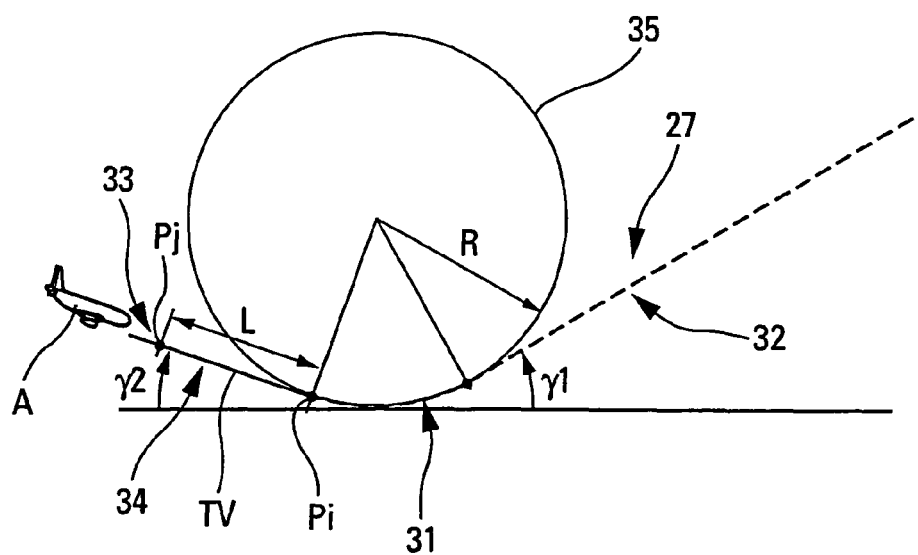

As represented in FIG. 5, the protection profile 27 comprises a first part 31 which is a resource curve, and a second part 32 which is a segment with maximum slope $\gamma 1$. This protection profile 27 applies at a point Pi of a segment 33 of the vertical trajectory TV, which presents a descent slope $\gamma 2$.

The protection profile 27 can comprise, moreover, a rectilinear segment 34 of slope $\gamma 2$ and of length L, upstream of the point Pi, for starting the projection of said protection profile 27 at a point Pj upstream. This rectilinear segment 34 makes it possible to take account of the reaction time of the pilot for triggering the resource maneuver. Naturally, if the resource maneuver is realized automatically, the distance L is zero and the protection profile 27 comprises no rectilinear segment 34.

In a simplified embodiment, as represented in FIG. 5, the part 31 is akin to an arc of a circle (part of a circle 35) and therefore presents a constant radius R, although by definition the resource is effected at constant load factor and at constant speed (the maximum angle of trim $\theta$max is then considered to be small) for a heavy aircraft.

Figure 6:
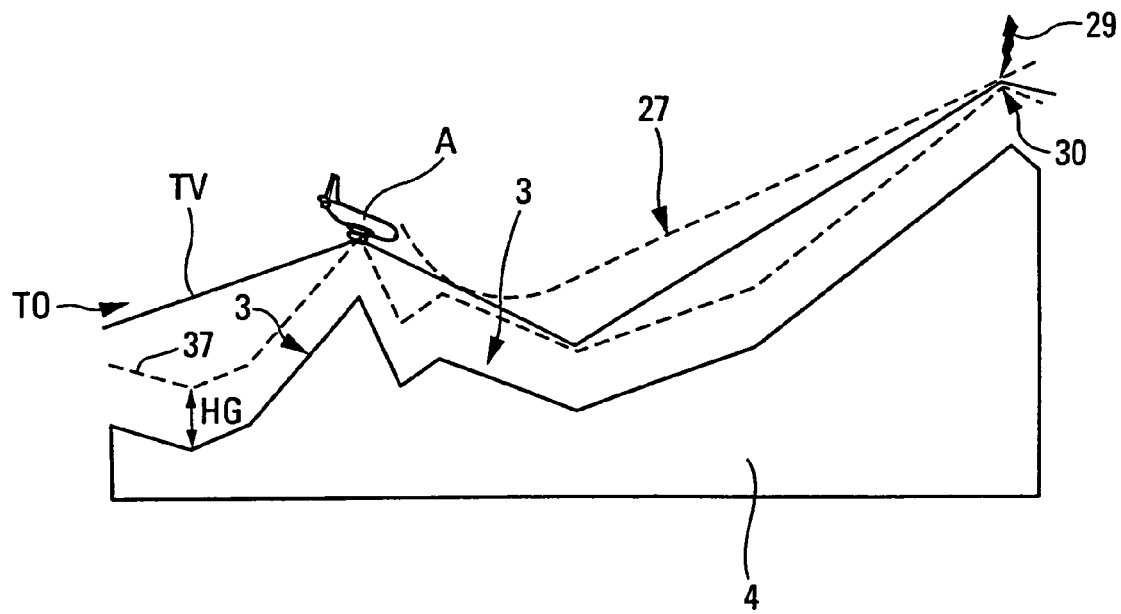

Represented in FIG. 6 is an application of the monitoring implemented by the monitoring means 26. In this case, the vertical trajectory TV is determined from a terrain profile 37 which is situated for safety reasons at a guard height HG above the relief 3 of the terrain 4. The protection profile 27 intercepts the vertical trajectory TV at the point 30. At this moment, the device 1 can emit a signal to warn the pilot.

Figure 7:
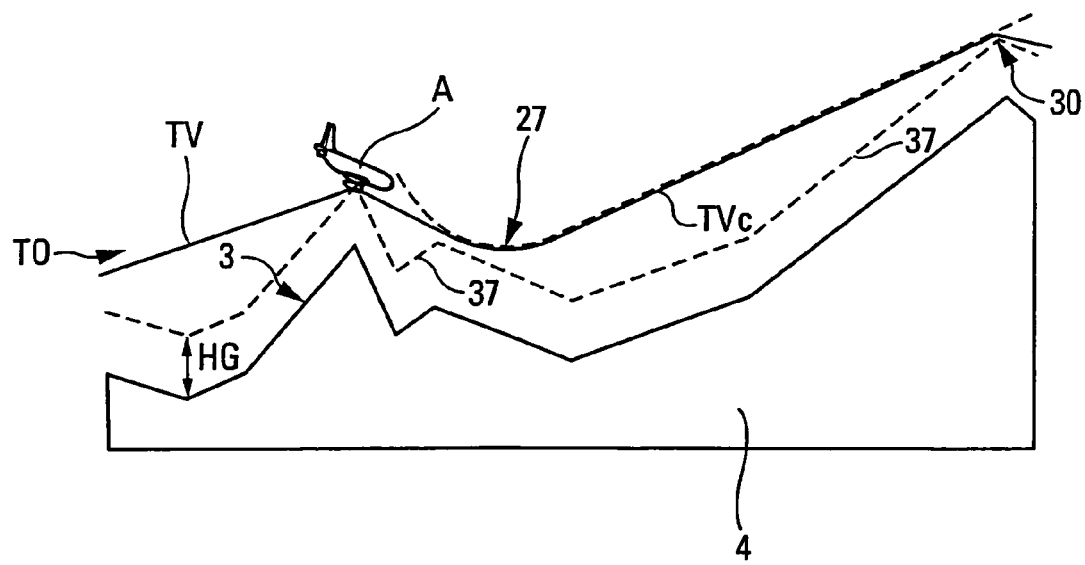

Moreover, said device 1 comprises a means 38 which is connected by links 39 and 40 to the monitoring unit 6 and to the information sources 5, to automatically update the vertical trajectory TV, and form a corrected trajectory TVc, as represented in FIG. 7. Said information sources 5 can transmit the vertical trajectory TVc thus updated to user devices, and in particular to the guidance system 2, through a link 41.

Additionally, said monitoring unit 6 moreover comprises a monitoring means 42 (connected to the link 11) for verifying the compatibility of the vertical trajectory TV with actual performance of the aircraft A.

To do this, said monitoring means 42 realizes the following operations, for each rectilinear segment of the vertical trajectory TV:

it determines a first maximum slope which represents the maximum slope, at which the aircraft A can fly under the current flight conditions with a faulty engine;
 it determines a second maximum slope which represents the maximum slope at which the aircraft A can fly under the current flight conditions with all its engines operational. Preferably, it determines said first and second maximum slopes from the current total slope of the aircraft A;
 it determines a preset slope allowing the aircraft A to fly along said flight trajectory TO; and
 it verifies that said preset slope is compatible with said first and second maximum slopes.

Additionally, said monitoring unit 6 moreover comprises a monitoring means 43 (connected to the link 12) for detecting any excessive deviation (lateral and/or vertical) of the position of the aircraft A with respect to said flight trajectory TO.

The device 1 in accordance with the invention therefore comprises a plurality of monitoring means 16, 17, 25, 26, 42, 43 implementing monitoring functions which all participate, at their level, in maintaining the integrity of the aircraft A during a low-altitude flight. Said device 1 therefore allows the implementation of a monitoring function:

which is global and makes it possible to eliminate the potential risks of collision of the aircraft A with the terrain overflown; and
 which is autonomous, so that it is very discrete and therefore not easily detectable (since it does not emit any radiation in contradistinction to a radar for example).

In a particular embodiment, said device 1 moreover comprises a means (integrated and not represented) for implementing a function for ensuring the safety of the flight trajectory during its construction.

Said means 3 determines the vertical trajectory TV (or flight profile) of the flight trajectory TO, not directly from a terrain profile which emanates for example from a digital database and which exhibits a certain margin of error, but from a safe terrain profile which takes account of a plurality of margins of error or uncertainties which exist, including that pertaining to the accuracy of the database. This makes it possible to obtain a vertical trajectory TV dispensing with any risk of collision of the aircraft A with the ground, while permitting low-altitude following of the terrain 2. To do this, said means 3 determines, on the basis of the terrain profile received from the digital database, a safe terrain profile which is such that, along said lateral trajectory TL, account is taken as elevation of the terrain, of the elevation which is the highest under the surface of uncertainty (or surface of extraction of a safe terrain profile) so as to form an auxiliary profile to which is added a predetermined guard height, for example 500 feet (around 150 meters), to obtain said safe terrain profile. Said uncertainty surface depends on an error margin relating to the position of the aircraft, an error margin relating to said terrain profile, and an error margin relating to the guidance of the aircraft along a trajectory. Moreover, advantageously, said uncertainty surface is centered with respect to the lateral trajectory of the flight trajectory.

The invention claimed is:

1. A method of ensuring the safety of a low-altitude flight of an aircraft which is guided along a flight trajectory, comprising a lateral trajectory and a vertical trajectory, said method comprising:
   determining current flight conditions;
   realizing a function for global and autonomous monitoring of said low-altitude flight of the aircraft, with the aid of said current flight conditions, making it possible to preserve the integrity of said aircraft during said flight; and
   presenting the results of the monitoring function thus realized to an operator,
   wherein, to realize said monitoring function, a first monitoring is realized so as to verify compatibility of a pre-computed vertical trajectory with an updated theoretical performance of the aircraft,
   wherein, to realize said first monitoring;
   a protection profile is formed with the aid of computation parameters relating to the aircraft and of exterior parameters, which are measured and updated, wherein said protection profile depends on a capacity of the aircraft to perform a resource at constant speed and at maximum slope,
   the protection profile is projected onto the vertical trajectory from a current position of the aircraft, downstream, along said vertical trajectory, and
   a check is carried out to verify if said protection profile thus projected tangentially intercepts said vertical trajectory, and a signal for warning a pilot of the aircraft is emitted when said protection profile tangentially intercepts said vertical trajectory.

2. The method as claimed in claim 1, wherein, to realize said monitoring function, a second monitoring is realized so as to verify the compatibility of the flight trajectory with terrain to be overflown.

3. The method as claimed in claim 2, wherein said second monitoring consists in verifying that the vertical trajectory of the flight trajectory, translated vertically downward by a predetermined guard height, does not intercept the terrain.

4. The method as claimed in claim 3, wherein, to realize said second monitoring, the following operations are performed for each curvilinear abscissa of the lateral trajectory of the flight trajectory:
   a highest altitude under an uncertainty surface related to said curvilinear abscissa is determined;
   the highest altitude is increased by said guard height so as to form a safety altitude; and
   a check is carried out to verify that an altitude of said curvilinear abscissa is greater than said safety altitude.

5. The method as claimed in claim 1, wherein, to realize said monitoring function, a second monitoring is realized so as to verify that said flight trajectory is continuous and maneuverable by the aircraft.

6. The method as claimed in claim 5, wherein, to realize said second monitoring, the following operations are performed for each curvilinear abscissa of the lateral trajectory of the flight trajectory:
   lateral and vertical radii of curvature corresponding respectively to the lateral trajectory and to the vertical trajectory are determined at said curvilinear abscissa;
   on the basis of these lateral and vertical radii of curvature are determined:
   a first load factor corresponding to a static load factor due to a turn at constant slope; and
   a second load factor corresponding to a vertical load factor due to a vertical transition at constant course; and
   a check is carried out to verify that said first and second load factors remain less than predetermined maximum values.

7. The method as claimed in claim 1, wherein, to realize said monitoring function, a second monitoring is realized so as to verify that a thrust of the aircraft required to maintain the slope and the preset speed such as they are defined for the flight trajectory, remains less than the maximum thrust available in the case of a fault with an engine of the aircraft.

8. The method as claimed in claim 1, wherein, to realize said first monitoring, the protection profile is associated with each peak of the vertical trajectory, and a check is carried out to verify the compatibility of a position of the aircraft with respect to said protection profile.

9. The method as claimed in claim 1, wherein said protection profile comprises a circular arc of constant radius and a rectilinear segment of maximum slope.

10. The method as claimed in claim 1, wherein, when said first monitoring detects the incompatibility, the vertical trajectory is automatically corrected ahead of the aircraft in such a way as to eliminate this incompatibility.

11. The method as claimed in claim 1, wherein, to realize said monitoring function, a second monitoring is realized so as to verify the compatibility of the vertical trajectory with actual performance of the aircraft.

12. The method as claimed in claim 11, wherein, to realize said second monitoring:
   a first maximum slope is determined which represents the maximum slope at which the aircraft can fly under the current flight conditions with a faulty engine;
   a second maximum slope is determined which represents the maximum slope at which the aircraft can fly under the current flight conditions with all its engines operational;
   a preset slope is determined allowing the aircraft to fly along said flight trajectory; and
   a check is carried out to verify that said preset slope is compatible with said first and second maximum slopes.

13. The method as claimed in claim 12, wherein said first and second maximum slopes are determined from the current total slope of the aircraft.

14. The method as claimed in claim 1, wherein, to realize said monitoring function, a second monitoring is realized so as to detect any excessive deviation of the position of the aircraft with respect to said flight trajectory.

15. The method as claimed in claim 1, wherein said current flight conditions comprise current meteorological conditions current characteristics of the aircraft.

16. The method as claimed in claim 1, wherein a function for ensuring the safety of the flight trajectory during its construction is implemented.

17. A device for ensuring the safety of a low-altitude flight of an aircraft which is guided along a flight trajectory, said device comprising:
   information sources able to determine current flight conditions;
   a monitoring unit for realizing, with the aid of said current flight conditions, a function for global and autonomous monitoring of said low-altitude flight of the aircraft, making it possible to preserve the integrity of said aircraft during said flight; and
   a presentation unit that presents the results of the monitoring function realized by said monitoring unit to an operator, wherein said monitoring unit comprises a first monitoring section so as to verify compatibility of a precomputed vertical trajectory with an updated theoretical performance of the aircraft,
   wherein, to realize said monitoring, the first monitoring section:
   forms a protection profile with the aid of computation parameters relating to the aircraft and of exterior parameters, which are measured and updated, wherein said protection profile depends on a capacity of the aircraft to perform a resource at constant speed and at maximum slope,
   projects the protection profile onto the vertical trajectory from a current position of the aircraft, downstream, along said vertical trajectory, and
   carries out a check to verify if said protection profile thus projected tangentially intercepts said vertical trajectory, and a signal for warning a pilot of the aircraft is emitted when said protection profile tangentially intercepts said vertical trajectory.

18. The device as claimed in claim 17, wherein said monitoring unit further comprises:
   a second monitoring section that verifies the compatibility of the flight trajectory with terrain to be overflown;
   a third monitoring section that verifies that said flight trajectory is continuous and maneuverable by the aircraft;
   a fourth monitoring section that verifies that a thrust of the aircraft required to maintain the slope and the preset speed such as they are defined for the flight trajectory to remain less than a maximum thrust available in the case of a fault with an engine of the aircraft;
   a fifth monitoring section that verifies the compatibility of the vertical trajectory with actual performance of the aircraft; and
   a sixth monitoring section that detects any excessive deviation of the position of the aircraft with respect to said flight trajectory.

19. The device as claimed in claim 17, further comprising an update section that automatically updates said flight trajectory.

20. The device as claimed in claim 17, further comprising an implementation section that implements a function to ensure safety of the flight trajectory during its construction.

21. An aircraft, which comprises a device for ensuring the safety of a low-altitude flight of an aircraft which is guided along a flight trajectory, said device comprising:
   information sources able to determine current flight conditions;
   a monitoring unit for realizing, with the aid of said current flight conditions, a function for global and autonomous monitoring of said low-altitude flight of the aircraft, making it possible to preserve the integrity of said aircraft during said flight; and
   a presentation unit that presents the results of the monitoring function realized by said monitoring unit to an operator, wherein said monitoring unit comprises a first monitoring section so as to verify compatibility of a precomputed vertical trajectory with an updated theoretical performance of the aircraft,
   wherein, to realize said monitoring, the first monitoring section:
   forms a protection profile with the aid of computation parameters relating to the aircraft and of exterior parameters, which are measured and updated, wherein said protection profile depends on a capacity of the aircraft to perform a resource at constant speed and at maximum slope,
   projects the protection profile onto the vertical trajectory from a current position of the aircraft, downstream, along said vertical trajectory, and
   carries out a check to verify said protection profile thus projected tangentially intercepts said vertical trajectory, and a signal for warning a pilot of the aircraft is emitted when said protection profile tangentially intercepts said vertical trajectory.

* * * * *